United States Patent Office 2,959,584
Patented Nov. 8, 1960

2,959,584

4-HYDROXYPROGESTERONE AND INTERMEDIATE THEREFOR

Josef Fried, New Brunswick, N.J., assignor to Olin Mathieson Chemical Corporation, New York, N.Y., a corporation of Virginia No Drawing. Filed Apr. 2, 1956, Ser. No. 575,308

2 Claims. (Cl. 260—239.5)

This invention relates to, and has for its object, the provision of steroids of the general formula

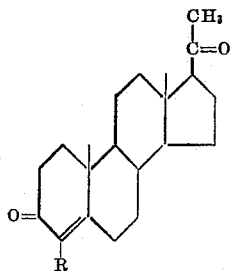

wherein R is hydroxy or acyloxy, particularly acyloxy radicals of hydrocarbon carboxylic acids having less than ten carbon atoms, exemplified by the lower alkanoic acids (e.g. acetic, propionic, butyric and enanthic acid), the monocyclic aromatic carboxylic acids (e.g. benzoic, toluic and xyloic acid) and the monocyclic aralkanoic acids (e.g. α-toluic and phenylacetic acid). These compounds are pharmacologically-active steroids, useful as oral progestational agents. Hence the new steroids of this invention can be used in lieu of known progestational steroids, and are administered perorally (e.g. in the form of tablets), in the treatment of functional uterine bleeding, for example, with concentration and/or dosage based on the activity of the particular compound.

The compounds of this invention are prepared from progesterone, by interacting the latter with osmium tetroxide in an inert solvent in which both reactants are soluble (e.g. ether and dioxane) in the presence of a basic catalyst (e.g. pyridine). The osmic acid ester initially formed is then treated with a basic reducing agent, such as sodium sulfite in water, to decompose the ester and yield 4-hydroxyprogesterone. The 4-hydroxyprogesterone thus obtained can then be esterified by treatment with an acylating agent such as an acyl halide or acid anhydride, preferably in an organic solvent (optimally in an organic base such as pyridine) to give the corresponding 4-acyloxy ester. The preferred acylating agents are those of organic hydrocarbon carboxylic acids containing less than ten carbon atoms as exemplified by the acyl chlorides and acid anhydrides of lower alkanoic acids, monocyclic aromatic carboxylic acids and monocyclic aralkanoic acids.

The following examples are illustrative of the invention (all temperatures being in centigrade):

EXAMPLE 1

*Osmic acid ester of allopregnane-4α,5α-diol-3,20-dione*

A solution of 1 g. of progesterone and 890 mg. of osmium tetroxide in 50 ml. of ether and 0.5 ml. of anhydrous pyridine is allowed to stand at room temperature in the dark. After 10 minutes, a brown crystalline precipitate appears which increases during the ensuing 2.5 hours and is filtered and washed with ether at that time. It amounts to about 1.64 grams. The mother liquors are allowed to stand at room temperature overnight and deposit an additional amount of crystals (about 463 mg.). The two crops represent the pyridine adduct of the osmic acid ester of progesterone, having the structural formula

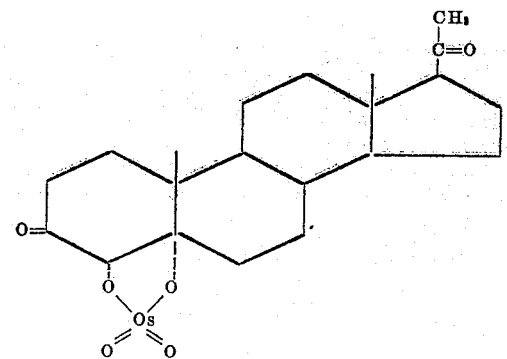

EXAMPLE 2

*4-hydroxyprogesterone*

To a solution of 1.234 grams of the osmic acid ester prepared in Example 1 in 15 ml. of dioxane is added a solution of 3.90 g. of sodium sulfite in 26 ml. of water and the mixture is refluxed on the steam bath for 20 minutes. After cooling, 30 ml. of chloroform is added, the mixture filtered and the black precipitate washed with chloroform. After separation of the layers the aqueous portion of the filtrate is extracted with more chloroform and the combined chloroform extracts washed with water. Drying over sodium sulfate followed by evaporation of the solvent produces a crystalline residue, which after recrystallization first from chloroform-alcohol and then from acetone yields pure 4-hydroxyprogesterone of the following properties: M.P. 230–232°; $[\alpha]_D^{23}+174°$ (c. 0.46 in $CHCl_3$);

$\lambda_{max}^{alc}$ 277 m$\mu$ ($\epsilon=13{,}000$); $\lambda_{max}^{2.5\%}$ KOH in MeOH 318 m$\mu$ ($\epsilon=7{,}300$); $\lambda_{max}^{nujol}$ 2.92$\mu$(OH), 5.89$\mu$(20-keto), 6.01$\mu$, 6.14$\mu$ ($\Delta^4$-3-keto)

As an enol 4-hydroxyprogesterone gives a strong coloration with $FeCl_3$.

*Analysis.*—Calcd. for $C_{21}H_{30}O_3$ (330.45): C, 76.32; H, 9.15. Found: C, 76.24; H, 8.94.

EXAMPLE 3

*4-acetoxyprogesterone*

A solution of 25 mg. of 4-hydroxyprogesterone in 0.5 ml. of pyridine and 0.5 ml. of acetic anhydride is allowed to remain at room temperature for 20 hours. At the end of that period the reagents are removed in vacuo, and the crystalline residue recrystallized from acetone-hexane. Pure 4-acetoxyprogesterone has the following properties: M.P. 162–163°; $[\alpha]_D^{23}+175°$ (c. 0.58 in $CHCl_3$);

$\lambda_{max}^{alc}$ 245 m$\mu$ ($\epsilon=16{,}700$); $\lambda_{max}^{nujol}$ 5.66$\mu$ (4-acetyl), 5.86$\mu$ (20-keto), 5.92$\mu$, 6.15$\mu$ ($\Delta^4$-3-keto)

*Analysis.*—Calcd. for $C_{23}H_{32}O_4$ (372.49): C, 74.16; H, 8.66. Found: C, 74.52; H, 8.39.

EXAMPLE 4

*4-hydroxyprogesterone 4-enanthate*

A solution of 81 mg. of 4-hydroxy-progesterone in 2 ml. of pyridine and 0.12 ml. of n-heptanoic anhydride is allowed to remain at room temperature for 16 hours. At the end of that period the pyridine is removed in vacuo the residue taken up in chloroform and the resulting solution extracted with dilute sulfuric acid, sodium bicarbonate and water. The extract is dried over sodium sulfate and the solvent evaporated in vacuo. The residue upon crystallization from acetone-hexane yields at first a small amount of 4-hydroxyprogesterone but concentration of the mother liquor yields as the main product the 4-enanthate of 4-hydroxy-progesterone having the following properties: M.P. 119–120°; $[\alpha]_D^{23}+153°$ (c. 0.75 in chloroform);

$$\lambda_{max}^{alc.} \ 244 \ m\mu \ (\epsilon=19,000)$$

*Analysis.*—Calculated for $C_{28}H_{42}O_4$ (442.60): C, 75.97; H, 9.56. Found: C, 75.71; H, 9.26.

Similarly by substituting other acylating agents for the acetic anhydride of Example 3 or heptanoic anhydride of Example 4 the corresponding ester derivatives are formed. Thus, benzoyl chloride yields 4-benzoyloxyprogesterone and α-toluyl chloride yields 4-α-toluyloxyprogesterone.

The invention may be variously otherwise embodied within the scope of the appended claims.

I claim:

1. The pyridine adduct of 4α,5α-dihydroxyprogesterone, 4,5-osmic acid ester.

2. A process for the preparation of 4-hydroxyprogesterone which consists of interacting progesterone and osmium tetroxide in a pyridine medium and treating the osmic acid ester-pyridine adduct thus formed with aqueous sodium sulfite.

References Cited in the file of this patent

UNITED STATES PATENTS

| | | |
|---|---|---|
| 2,341,081 | Butenandt | Feb. 8, 1944 |
| 2,437,564 | Serini et al. | Mar. 9, 1948 |
| 2,762,818 | Levy | Sept. 11, 1956 |
| 2,816,120 | Fried | Dec. 10, 1957 |